Aug. 29, 1939.　　　　F. S. ENGEL　　　　2,170,858
TIME AND DISTANCE RECORDER
Filed April 10, 1937　　　　6 Sheets—Sheet 2

INVENTOR.
Fred S. Engel
BY
ATTORNEY.

Aug. 29, 1939.　　　　F. S. ENGEL　　　　2,170,858
TIME AND DISTANCE RECORDER
Filed April 10, 1937　　　6 Sheets-Sheet 4

INVENTOR.
Fred S. Engel
BY
ATTORNEY.

Aug. 29, 1939. F. S. ENGEL 2,170,858
TIME AND DISTANCE RECORDER
Filed April 10, 1937 6 Sheets-Sheet 5
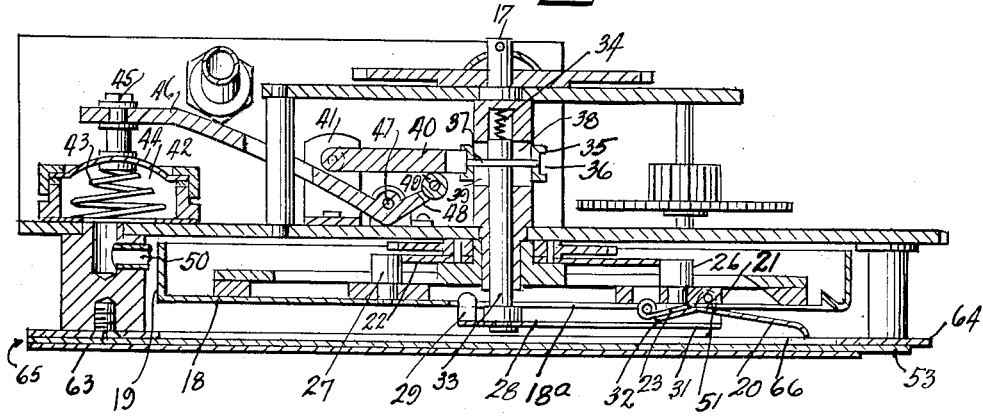
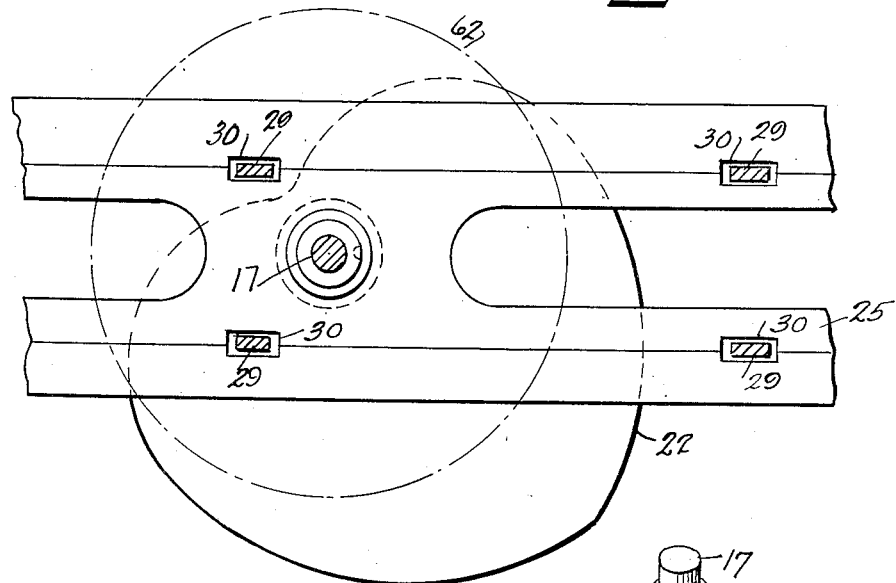
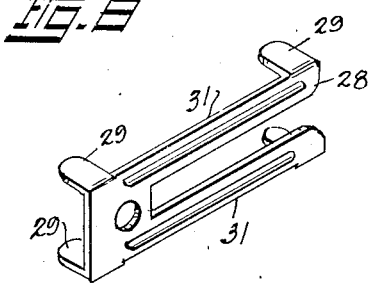
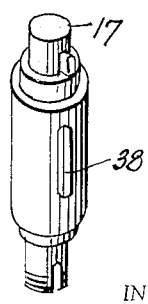
INVENTOR.
Fred S. Engel
BY
ATTORNEY.

Aug. 29, 1939.　　　　F. S. ENGEL　　　　2,170,858
TIME AND DISTANCE RECORDER
Filed April 10, 1937　　　6 Sheets-Sheet 6

INVENTOR.
Fred S. Engel
BY
ATTORNEY.

Patented Aug. 29, 1939

2,170,858

UNITED STATES PATENT OFFICE 2,170,858

TIME AND DISTANCE RECORDER

Fred S. Engel, Brooklyn, N. Y.

Application April 10, 1937, Serial No. 136,045

7 Claims. (Cl. 234—32)

My present invention relates to a device for automatically producing records of the operation of a motor vehicle in which it may be installed, including the speed and stops, and indicating whether or not the motor was running when the vehicle was not travelling, and in association with such record the time of day or night as indicated at which such records were made.

A principal object of the invention is to provide apparatus adapted to produce such a record.

Another object is to check up on the operator of a vehicle the actual service and mileage which he may claim for the vehicle during a definite time, the gasoline and oil consumption, and other factors which are important in the operation of automobile vehicles, which is especially desirable in organizations where several vehicles are in use.

Other objects will be apparent on reading this specification, taken in connection with the accompanying drawings, in which Figure 1 is a front view of my device in which the case has been partially opened;

Figure 6 is a diagonal cross section taken along the line 6—6 of Figure 4;

Figure 7 is a plan view of the cam assembly;

Figure 8 is a table adapted to rock the stylus into operative position;

Figure 9 is a perspective of the post assembly;

Figure 1:
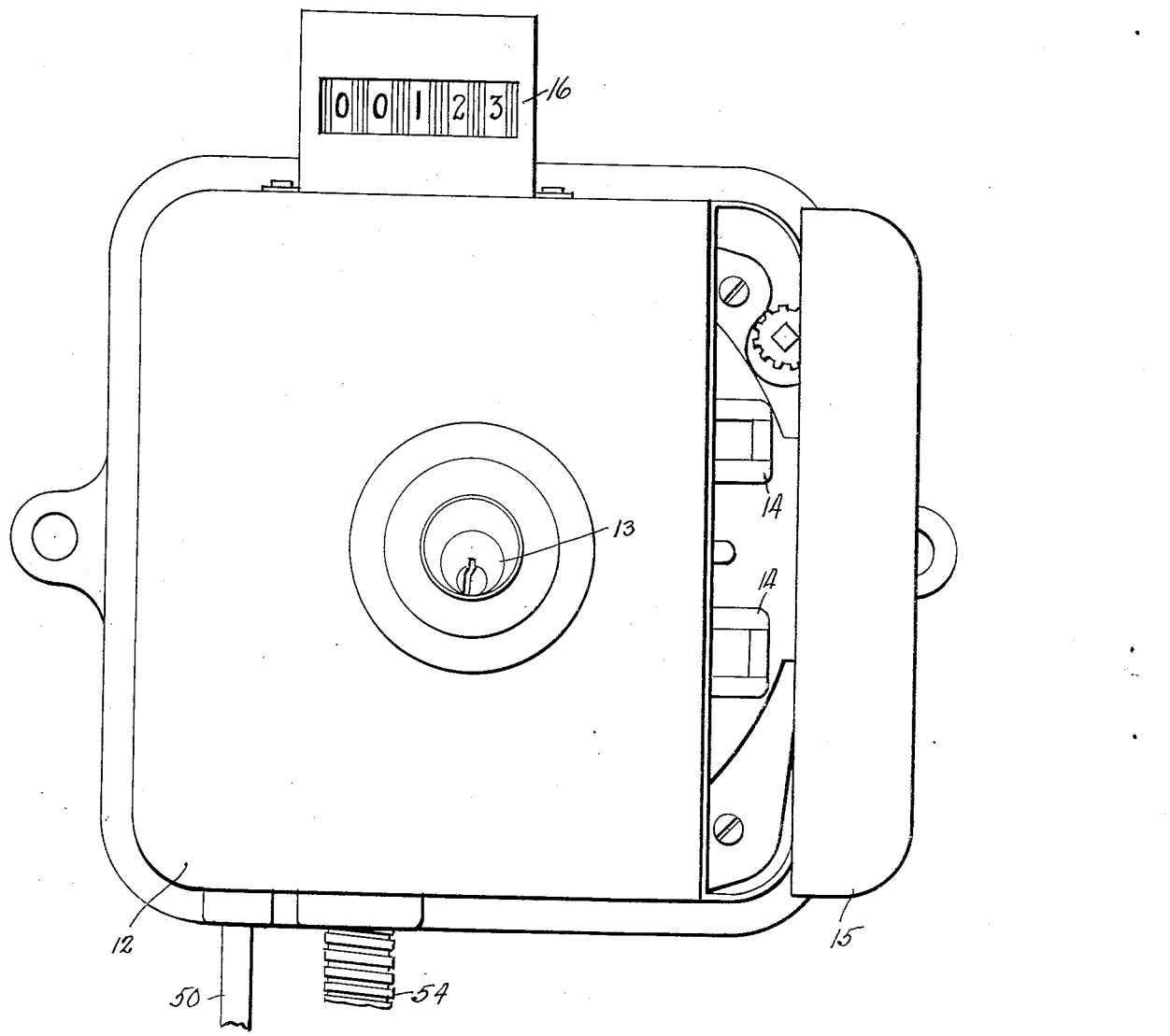

Referring now in detail to the drawings in which similar characters refer to corresponding parts throughout, 12 is a case in which my device is mounted, provided with a lock 13 which cooperates with the latches 14. This case has a hinged cover 15 at one corner edge, which when closed is secured by a keeper (not shown) on its inner side, cooperating with the latches 14. An odometer 16 is mounted on the case.

A clock mechanism geared for a twenty-four hour cycle, but otherwise of conventional construction, is provided having the driven shaft 17 which rotably controls the post 33 (Figure 6), on which is mounted a time disc 18, containing markings for the hours and fractions thereof on the rim 19, and which is also calibrated to a twenty-four hour cycle, the hours corresponding to the day being indicated in the unshaded portion and the hours indicating the night being indicated in the shaded portion.

The time disc 18 is cut away at 18a to permit the reciprocal movement of the stylus 20 which is carried by the stylus carriage 21 operating reciprocally in the guides 25. The reciprocal movement of said stylus is controlled by the cooperation of the rolls 26 and 27, mounted on the underside of the stylus carriage 21, with the periphery of the revolving cam 22. The stylus 20 is pivoted at 51 intermediate its ends in the carriage 21 in such manner as to afford it a limited forward and receding movement. A spring 23 acting upon the stylus maintains the same normally in its receded position away from the record card 53. The forward and receding movement of the stylus is controlled by the table 28 (shown in detail in Figure 8) which is secured at one end in the post 33. This table is provided with guide legs 29 which slide in grooves 30 of the guides 25 (Figure 7). The tines 31 of the table are in contact with the end 32 of the stylus and effect a rocking motion of said stylus upon the reciprocation of the post 33.

The post 33 is mounted in slidable relation in the recess of shaft 17, a spring 34 being provided between the bottom of said recess and the top of said post to dispose the post normally in extended position. The said post 33 is provided with a collar 35 having the annular recess 36, which collar is keyed to said post by the pin 37 which extends therethrough. Slots 38 and 39 are provided in the shaft 17 (Figure 9) on opposite sides to permit the reciprocal movement of the post 33 in the shaft 17. A fork 40 is hingeably mounted on the bracket 41, the fork tines engaging the collar 35 through the cooperating groove 36 thereof. A vacuum chamber 42 is provided having the spring 43 therein to hold the flexible bellows 44 normally in extended position. Connected with said bellows 44 through the stud 45 is a lever 46 fulcrumed at 47 and having a leg 48 angularly disposed therefrom, on the end of which is a roller 49 which bears upon the fork 40. A vacuum pipe 50 is provided which is connected with the vacuum tank of the machine. Upon the operation of the motor of the machine a vacuum will be created in the vacuum tank which is in communication with the vacuum chamber 42 and the action of the vacuum causes the drawing of the bellows inward and the consequent drawing down of the long end of the lever 46, which action, through the angle leg 48 and roller 49 upon the fork 40 will raise the collar 35 and with it the post 33 and the table 28, the tines 31 of which will press inward the end 32 of the stylus and through the fulcrum 51 press the stylus point 52 upon the card 53.

Figure 5:
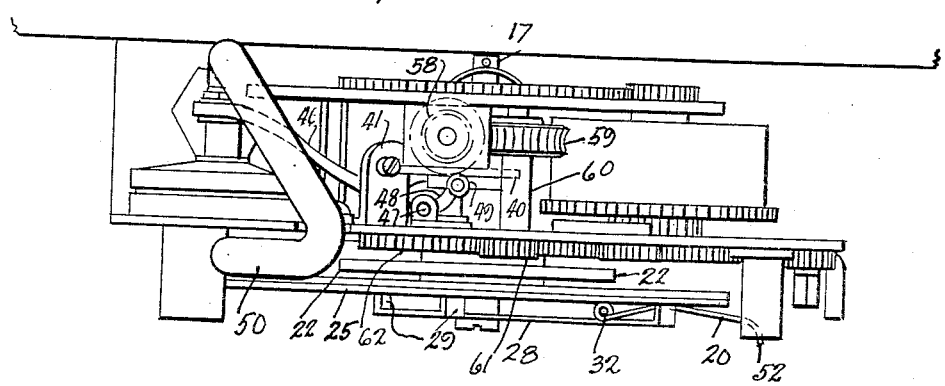
Figure 5 is a top view with the time disc omitted.

A flexible shaft, controlled in its rotating movement by the travel of the vehicle, enters the recording instrument through the sheath 54 (Figure 3), and is provided with a gear 55 which meshes with the gear 56 keyed to the shaft 57. The shaft 57 is provided with a worm 58 which intermeshes with the gear 59 on the shaft 60. At the opposite end of the shaft 60 (Figure 5) is a small gear 61 which meshes with a larger gear 62 which in turn is keyed to the heart cam 22 and rotates the same.

Figure 2:
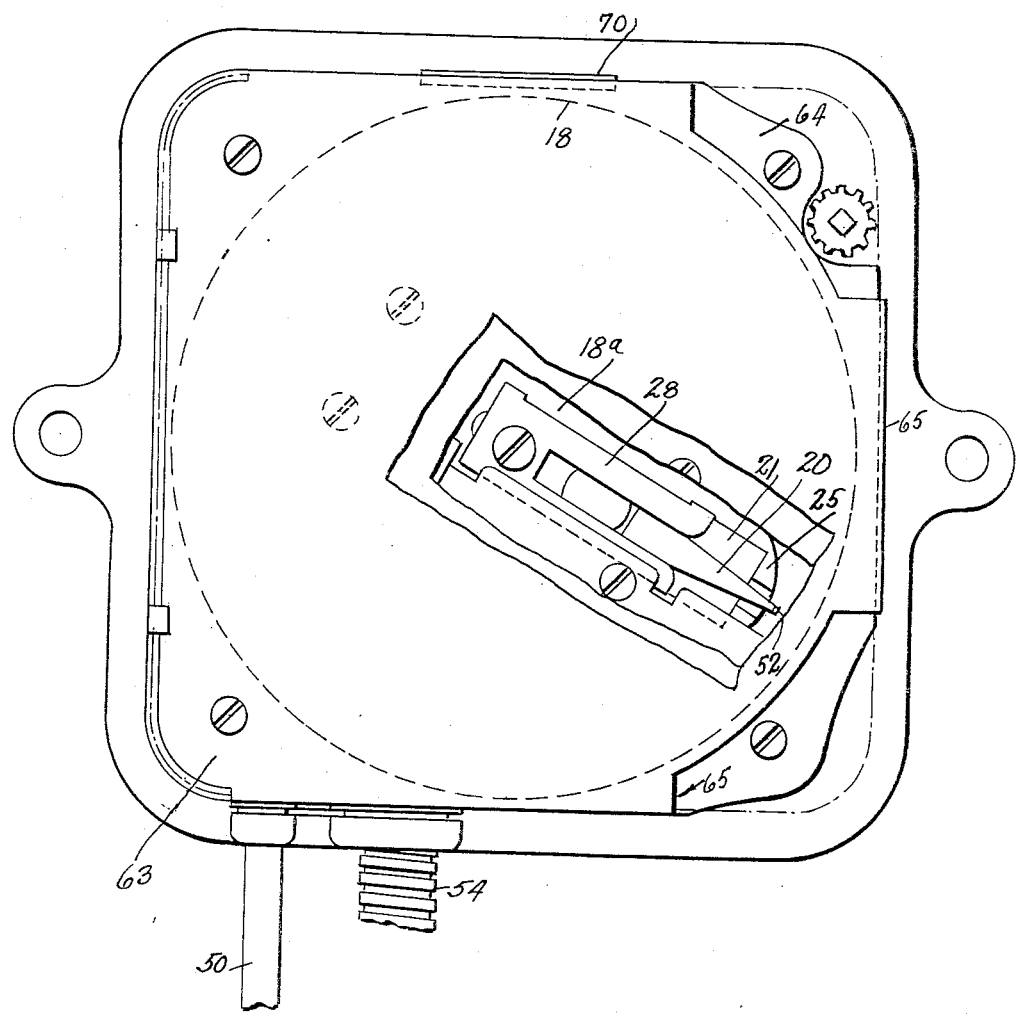
Figure 2 is a similar view of Figure 1 in which the case is removed, a portion of the front plate being broken away to show part of the stylus mechanism.

A holder is provided for the card record consisting of a plate 63 (Figure 2) and a spaced frame 64, the said frame coinciding substantially with the plate 63 in its outer dimensions, but containing a large circular chamber 66 therein. The slot of said holder is indicated at 65 and extends the entire breadth of the said holder. This slot is adapted to admit to the said holder, the record card 53 which, when in place, is supported along its marginal ends on one side by the frame 64, the other side of said card being fully backed by the plate 63. The stylus point 52 is adapted to contact with the card when the card is placed in said holder and the vehicle motor is in operation.

In one side of the instrument cover is a window having the magnifying glass 70 which is in line with the time flange 19 of the time disc 18 and in such position as to give the operator a sight of the rim of the time disc and thereby enable him to ascertain the time of day from the instrument.

I have not described the details of the clock mechanism inasmuch as such mechanism in itself does not form any part of my invention. In operation, the clock mechanism revolves the shaft 17, which shaft through a chain of mechanism which will be explained, imparts to the stylus 52 and the time disc 18 a revolving timed motion. The travel of the vehicle is communicated to the flexible shaft in the sheath 54 in any well known manner, and through a chain of mechanism which will be explained revolves the heart cam 22 and subjects the stylus to a reciprocating motion, the speed of such reciprocation corresponding with the speed of the vehicle. The vacuum chamber 42, being connected with the vacuum tank of the car, becomes exhausted upon the motor of the machine being started, and continues in such exhausted condition while the motor is running. The effect of exhausting the said chamber is to draw down the lever 46 and through a chain of mechanism, the operation of which will also be hereafter explained, the stylus 52 is brought in contact with the face of the card 53, and imparts markings, which constitute the record, thereon.

Figure 10:
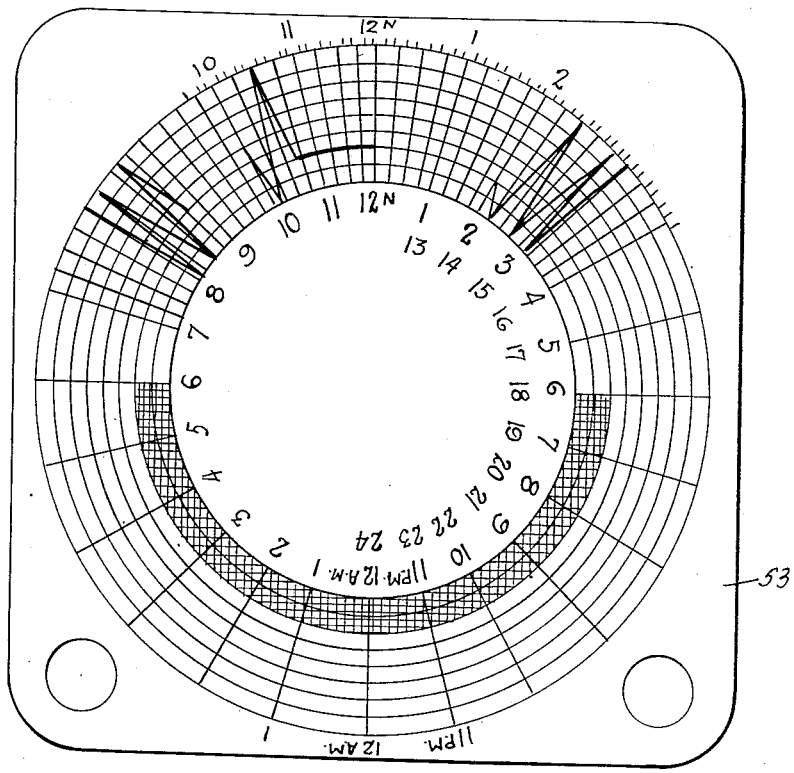
Figure 10 is a record card in position in my device.
Figure 11:
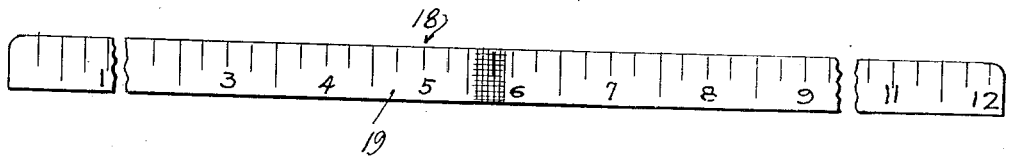
Figure 11 is the rim of the time disc.

A form or record card adaptable for use in my recording device is illustrated in Figure 10 and contains numerals representing the twenty-four hours of the day, the hours of the afternoon being depicted in two forms commencing from one to twelve and from thirteen to twenty-four respectively, the clock mechanism being adapted to describe a twenty-four hour cycle instead of the usual twelve-hour cycle. The spaces between the radial printed lines at the top of the card represent quarter hours and said lines, although shown in only a portion of the card, are continued throughout the circle. The spaces between the circular lines on the card represent the distance travelled. If we assume that the distance between two parallel circular lines represents a quarter of a mile, one of the records on this card shows that between the hours of ten and twelve in the forenoon the vehicle travelled 4½ miles, that the travel of the vehicle started at ten o'clock and continued until about ten forty o'clock, the motor continued to run without the vehicle travelling until twelve o'clock noon when the motor was shut off.

I preferably use a sensitized record card which will record the travel of a metal stylus thereon, which obviates the necessity for renewing the recording element of the stylus which would otherwise be necessary.

In operation, my device is adapted, upon the start of a motor car with which it is connected, to simultaneously hold the stylus point on a record blank, draw and propel such point while in contact with the record blank, and chronologically revolve the stylus point on the record blank, thereby making a record of the time, distance of travel of a motor vehicle as well as of the operation of the motor while the motor vehicle is not travelling.

Upon the starting of the motor, a vacuum is effected in the vacuum tank of the car which operates upon the vacuum chamber 43, draws down the lever 46 on one side of fulcrum 47 and raises the lever on the other side of the fulcrum and with it the roll 49. This roll bears upon the hinged fork 40, the tines of which are disposed in the channeled collar 36, which collar is pinned into the post 33, at the opposite end of which is supported the table 28. Mounted in the guide 25 is a slide 21 in which is hingeably mounted the stylus 20 having the stylus point 52. The end of the stylus opposite the point rests on the table 28. It will be seen that upon the vacuum action described the table is raised and the stylus rocked so that the point 52 will bear upon the record card.

A heart-shaped cam 22 is provided which is adapted to rotate on the shaft 17. Rolls 26, 27 are provided on the slide 21 to bear diametrically opposite to each other on the periphery of said cam. Upon the rotation of the cam the slide, and with it, the stylus, is given a forward and backward movement, the point of the stylus bearing on the record.

Figure 3:
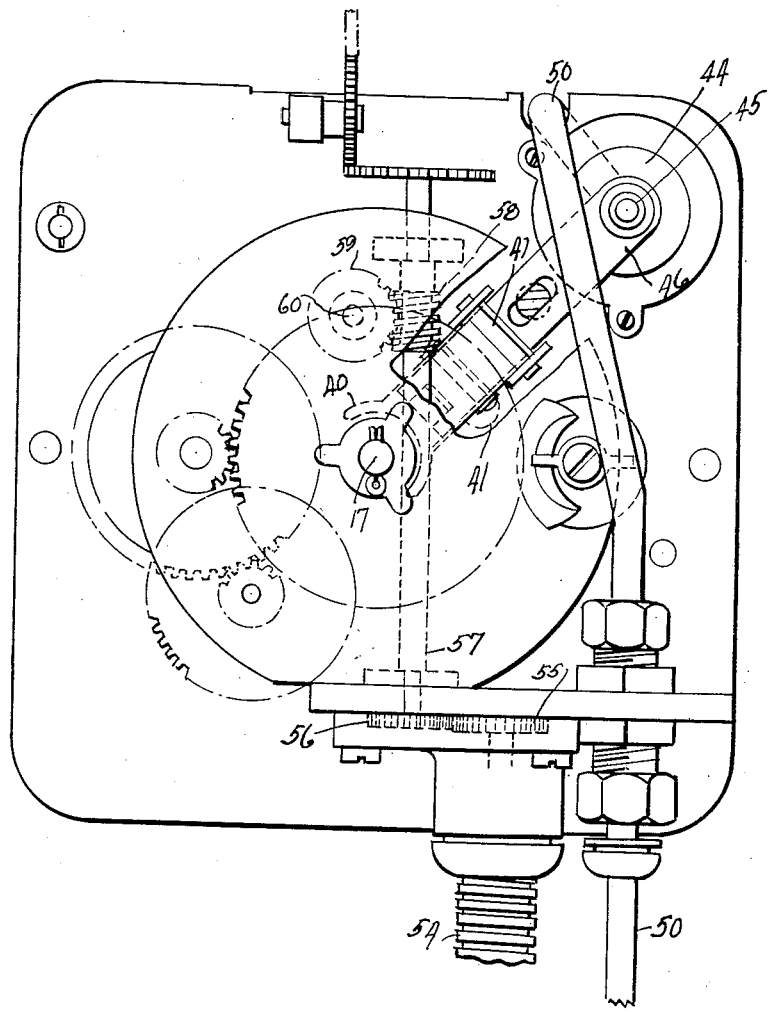
Figure 3 is a rear plan view of my device with the rear plate assembly.
Figure 4:
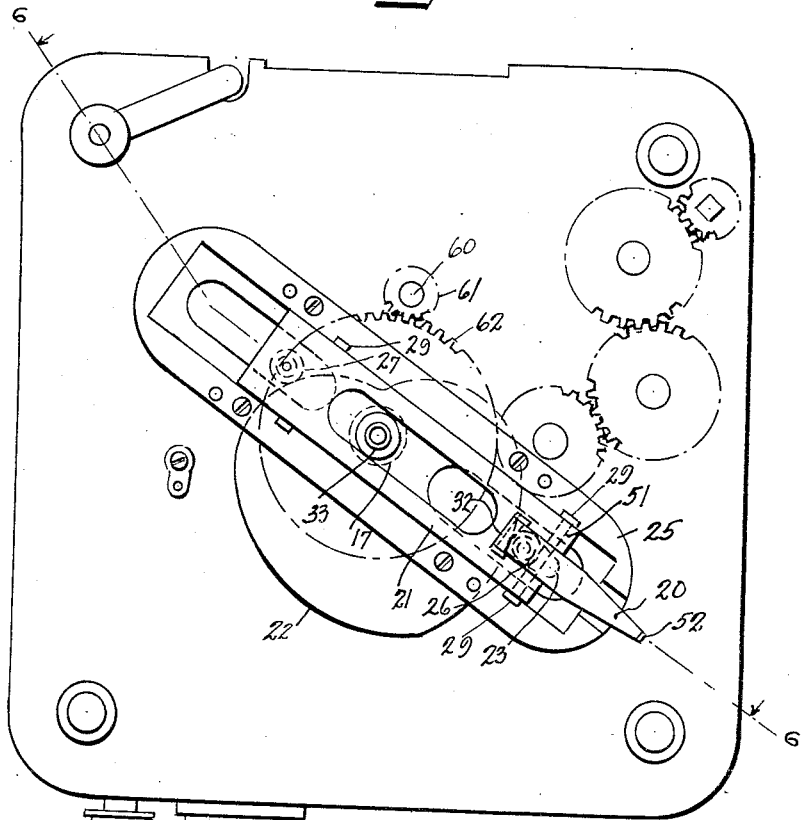
Figure 4 is a front view with the front plate assembly.

The operation of the cam is controlled by the travel of the vehicle. A flexible shaft is connected in the conventional way to the vehicle, and is carried in the sheath 54. The flexible shaft has a gear 55 mounted on the end thereof in the recording instrument, which gear operates the gear 56 splined onto the shaft 57 having the worm 58 operating the gear 59 (Figure 3). Now referring to Figure 5, it will be seen that the gear 59 is mounted on the shaft 60 at the end of which is splined the gear 61 which in turn operates the gear 62 on which is mounted the heart cam 22 which operates upon the rolls 26 and 27 in the slide 21. The said slide carries the stylus and thus gives the stylus a forward and backward movement on the record.

The revolving movement of the stylus is controlled by a clock having the shaft 17, near the end of which shaft is mounted the time disc 18 having the flange 19 on which are depicted the hours of the day and night. In this time disc is a radial slot 18a. Mounted on this time disc is the slide 21 which supports the stylus through said radial slot 18a. It will be seen that upon the rotation of the shaft 17 by the clock mechanism the time disc 18 will be given a rotating movement which will revolve the stylus carried thereby.

I have shown and described what I believe to be the best embodiment of my invention. I do not wish to be confined, however, in patent protection to the embodiment shown and described, but what I desire to cover by Letters Patent is set forth in the appended claims.

I claim:

1. In a recording apparatus, a support, a table carried thereby, and means for raising and lowering said support and with it the table, a carriage, a stylus hingeably mounted thereon, and means to resiliently hold one end of said stylus in receded position in contact with said table and adapting said stylus to be oscillated by the movements thereof.

2. In a recording apparatus, a stylus, means for holding a stationary record blank, a disc, a rotatable support for said disc to revolve the same, a carriage in which said stylus is hinged, means to radially slide said carriage, and with it the stylus, means to rock the stylus into contact with said blank, and means for mounting said carriage to revolve with said disc, and thereby make a record on said blank.

3. The structure set forth in claim 2 in which the means for mounting the carriage to revolve with the disc consists of the disc having a slot therein and the carriage partially occupying said slot.

4. The structure set forth in claim 2 in which resilient means are provided to normally hold the stylus in receded position.

5. In a recording apparatus, a rotatable sleeve, a carriage guide secured thereto to turn therewith, a carriage slidably connected with said carriage guide, means to reciprocate said carriage, a shaft within the aforesaid sleeve, a table mounted at one end of said shaft, a stylus hingeably mounted intermediate thereof on said carriage with the non-marking end of said stylus supported by said table, means to raise and lower the shaft and with it the table and thereby rock the stylus into and out of contact with a blank.

6. The structure set forth in claim 5 in which guide elements are provided in said table and said carriage guide, said elements cooperating with each other to maintain the table in alignment with said carriage and carriage guide.

7. In a recording apparatus, a stylus, means for holding a stationary record blank, a disc, a rotatable support for said disc to revolve the same, a carriage in which said stylus is hinged, means to radially slide said carriage, and with it the stylus, a table to support the non-marking end of said stylus, and means for raising said table and with it the non-marking end of said stylus and thereby lower the marking end of said stylus.

FRED S. ENGEL.